(12) United States Patent
Wiegman

(10) Patent No.: US 11,623,743 B2
(45) Date of Patent: Apr. 11, 2023

(54) SYSTEM AND METHOD OF ROTOR MANAGEMENT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/383,667

(22) Filed: Jul. 23, 2021

(65) Prior Publication Data

US 2023/0027852 A1 Jan. 26, 2023

(51) Int. Cl.
*B64C 27/30* (2006.01)
*B64C 29/00* (2006.01)

(52) U.S. Cl.
CPC .......... *B64C 27/30* (2013.01); *B64C 29/0025* (2013.01); *B64C 2230/28* (2013.01)

(58) Field of Classification Search
CPC .. B64C 29/0033; B64C 29/0075; B64C 27/30
See application file for complete search history.

(56) References Cited

U.S. PATENT DOCUMENTS

| 5,055,764 | A  | * | 10/1991 | Rozman ................. F02N 11/04 322/29 |
| 6,457,672 | B1 | * | 10/2002 | Tai ......................... B64C 19/02 244/130 |
| 9,975,629 | B2 |   | 5/2018  | Horn |
| 10,144,510 | B1 | * | 12/2018 | Vander Lind ............ B64F 3/00 |
| 2013/0020429 | A1 |   | 1/2013 | Kroo |
| 2017/0341741 | A1 | * | 11/2017 | Horn .................... B64C 27/467 |
| 2018/0229837 | A1 | * | 8/2018  | Kimchi .................. B64C 25/52 |
| 2018/0251215 | A1 | * | 9/2018  | Lind ...................... B64C 27/30 |
| 2020/0108918 | A1 | * | 4/2020  | Douglas ............... B64C 29/0033 |
| 2020/0391858 | A1 | * | 12/2020 | Snider .................... B64C 27/52 |

* cited by examiner

*Primary Examiner* — Tien Q Dinh
*Assistant Examiner* — William L Gmoser
(74) *Attorney, Agent, or Firm* — Caldwell Intellectual Property Law

(57) ABSTRACT

In an aspect, a system comprising a computing device. The computing device is configured to determine a drag minimization axis of a rotor connected to an aircraft. The rotor includes a first end and a second end. The rotor is configured to rotate about an axis. The computing device is further configured to determine a halting point of the rotor, wherein the halting point includes a drag minimization axis of the rotor. The computing device is configured to send a halting command to at least a magnetic element to halt the rotor, wherein the halting process is configured to stop a movement of the rotor and position the rotor in the halting point. The position of the rotor in the halting point includes the first end pointing in one direction of the drag minimization axis and the second end pointing in an opposite direction of the first end.

20 Claims, 6 Drawing Sheets

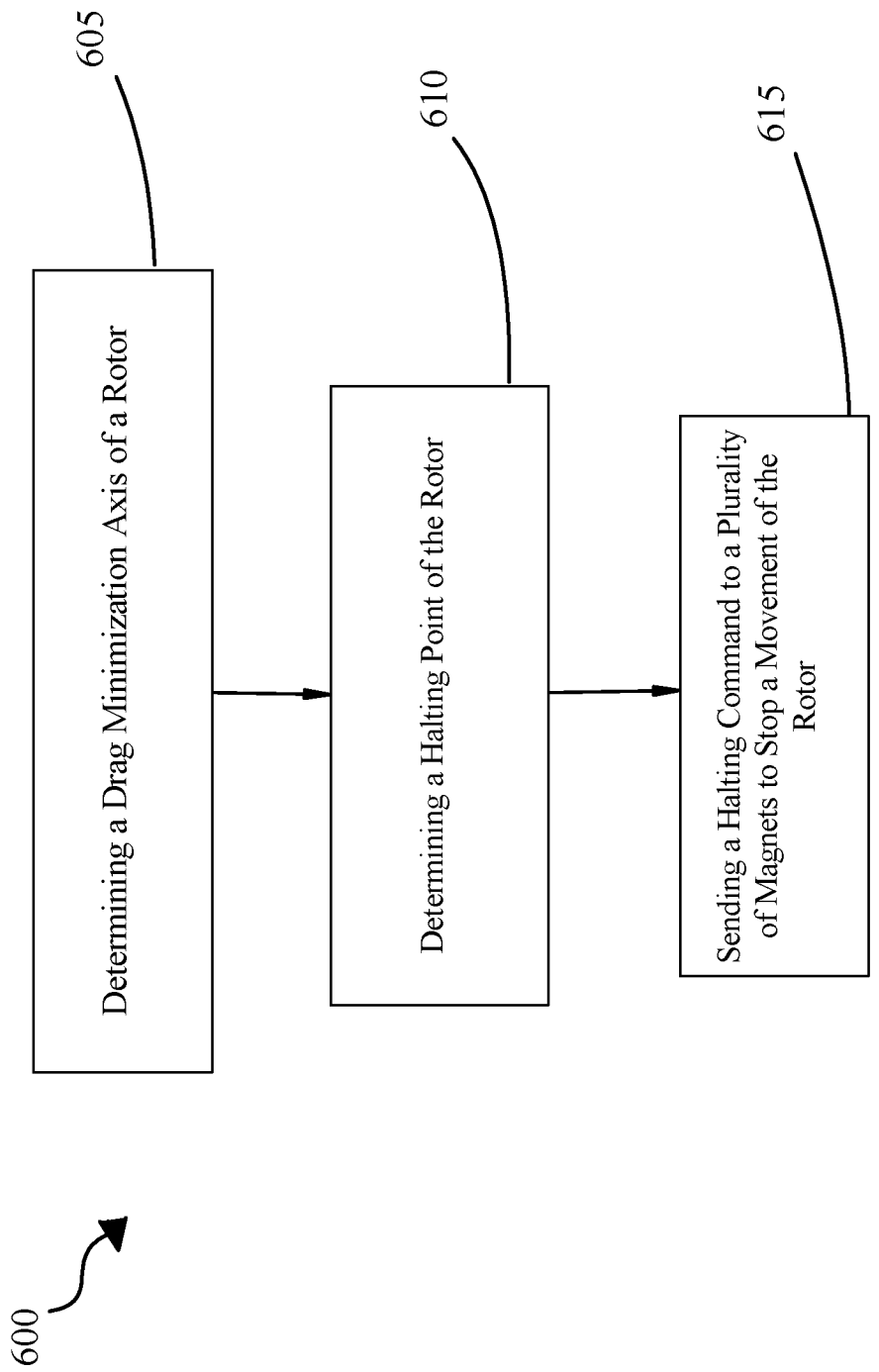

SYSTEM AND METHOD OF ROTOR MANAGEMENT

FIELD OF THE INVENTION

The present invention generally relates to the field of rotor management in aircraft. In particular, the present invention is directed to a system and method for rotor management to reduce drag for an electric aircraft.

BACKGROUND

Modern aircraft, such as vertical landing and takeoff aircraft (VTOL) may include a set of rotors. These rotors may be stationary and not in use during edgewise flight. As such, they may increase the air resistance and/or drag on the aircraft.

SUMMARY OF THE DISCLOSURE

In an aspect, a system comprising a computing device. The computing device is configured to determine a drag minimization axis of a rotor connected to an aircraft. The rotor includes a first end and a second end. The rotor is configured to rotate about an axis. The computing device is further configured to determine a halting point of the rotor, wherein the halting point includes a drag minimization axis of the rotor. The computing device is configured to send a halting command to at least a magnetic element to halt the rotor, wherein the halting process is configured to stop a movement of the rotor and position the rotor in the halting point. The position of the rotor in the halting point includes the first end pointing in one direction of the drag minimization axis and the second end pointing in an opposite direction of the first end.

In an aspect, a method comprising determining a drag minimization axis of a rotor connected to an aircraft. The rotor includes a first end and a second end. The rotor is configured to rotate about an axis. The method includes determining a halting point of the rotor. The halting point includes a drag minimization axis of the rotor. The method includes sending a halting command to at least a magnetic element to halt the rotor. The halting command is configured to stop a movement of the rotor and position the rotor in the halting point. The position of the rotor in the halting point includes the first end pointing in one direction of the drag minimization axis and the second end pointing in an opposite direction of the first end.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a flowchart of an exemplary embodiment of a method of rotor management.

DETAILED DESCRIPTION

Figure 1:
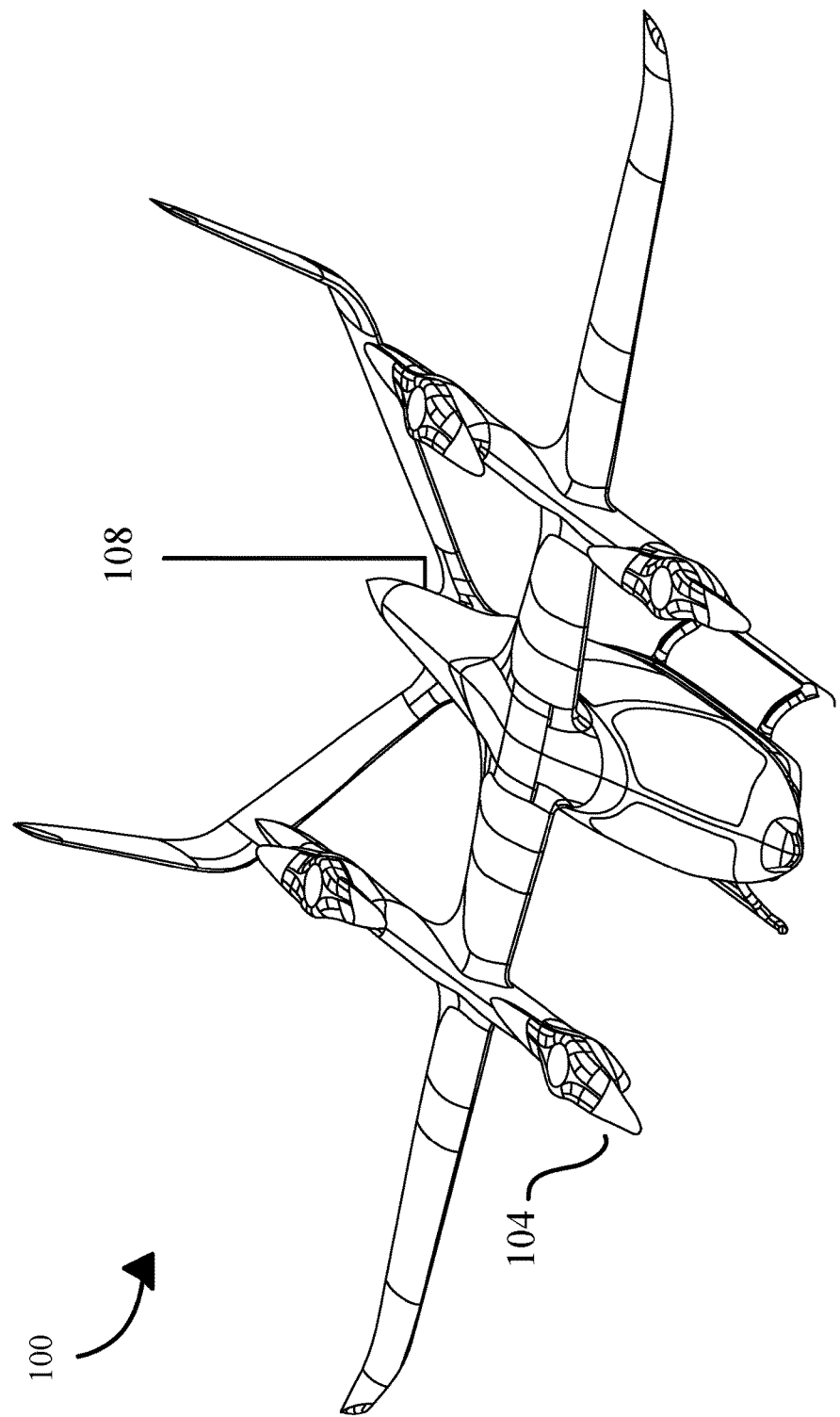
FIG. 1 is a front view of an exemplary embodiment of an electric aircraft.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system including a computing device. In some embodiments, a computing device may be configured to determine a drag minimization axis of a rotor. In some embodiments, a rotor may be connected to an aircraft. In some embodiments, a rotor may include a first and a second end. In some embodiments, a rotor may be configured to rotate about an axis. In some embodiments, a computing device may be configured to determine a halting point of a rotor. In some embodiments, determining a halting point may include determining if a rotor is in a stable position once the rotor has halted. A halting point may include a drag minimization axis of a rotor. In some embodiments, a computing device may be configured to send a halting command to at least a magnetic element. A halting command may include a command to halt a rotor. In some embodiments, a halting command may include a command to stop a movement of a rotor. In some embodiments, a halting command may include a command to position a rotor in a halting point. In some embodiments, a position of a rotor in a halting point may include a first end of the rotor pointing in one direction of a drag minimization axis and a second end of the rotor pointing in an opposite direction of the first end. In some embodiments, determining a halting point of a rotor may include determining if the rotor is in a stable position once the rotor has halted. In some embodiments, if a rotor is determined not to be in a stable position, a computing device may be configured to send a command to at least a magnetic element to rotate the rotor in a direction of rotation until the rotor is in a stable position. In some embodiments, a computing device may be configured to detect a torque of a rotor and send a command to at least a magnetic element to apply a net zero torque to the rotor. In some embodiments, a computing device may be configured to determine a starting point of a rotor. In some embodiments, a computing device may be configured to determine a rotational angle of a rotor. In some embodiments, a computing device may be configured to send a command to at least a magnetic element to rotate a rotor to a starting point based on a rotational angle of the rotor. In some embodiments, a starting point of a rotor may include a point of the rotor to continue rotating after being halted. In some embodiments, a computing device may be configured to continuously update a halting point of a rotor based on a feedback from a sensor of the rotor. In some embodiments, a computing device may be configured to utilize a machine learning model to determine an optimal halting point. In some embodiments, a computing device may be configured to determine a starting point of a rotor while the rotor is in a halted position. In some embodiments, a computing device may be configured to determine a torque threshold. In some embodiments, a torque threshold may include an amount of torque needed to rotate a rotor at a specific rate of rotation. In some embodiments, a halting command may be configured to stop a movement of a rotor during a flight of an aircraft.

Described herein is a method including determining a drag minimization axis of a rotor. In some embodiments, a rotor may be connected to an aircraft. In some embodiments, a rotor may include a first end and a second end. In some embodiments, a rotor may be configured to rotate about an axis. In some embodiments, a method includes determining a halting point of a rotor. A halting point may include a drag minimization axis of a rotor. In some embodiments, a method includes sending a halting command to at least a magnetic element to halt a rotor. In some embodiments, a halting command may be configured to stop a movement of a rotor and position the rotor in a halting point. In some embodiments, a position of a rotor in a halting point may include a first end of a rotor pointing in one direction of a drag minimization axis and a second end of the rotor pointing in an opposite direction of the first end. In some embodiments, determining a halting point of a rotor may include determining if the rotor is in a stable position once the rotor has halted. In some embodiments, if a rotor is determined not to be in a stable position, a computing device may be configured to send a command to at least a magnetic element to rotate the rotor in a direction of rotating until the rotor is in a stable position. In some embodiments, a computing device may be configured to detect a torque of a rotor and send a command to a plurality of magnets to apply a net zero torque to the rotor. In some embodiments, a computing device may be configured to determine a starting point of a rotor. In some embodiments, a computing device may be configured to determine a rotational angle of a rotor. In some embodiments, a computing device may be configured to send a command to at least a magnetic element to rotate a rotor to a starting point based on a rotational angle of the rotor. In some embodiments, a starting point of a rotor may include a point of the rotor to continue rotating after being halted. In some embodiments, a computing device may be configured to continuously update a halting point of a rotor based on a feedback from a sensor of the rotor. In some embodiments, a computing device may be configured to utilize a machine learning model to determine an optimal halting point. In some embodiments, a computing device may be configured to determine a starting point of a rotor while the rotor is in a halted position. In some embodiments, a computing device may be configured to determine a torque threshold. In some embodiments, a torque threshold may include an amount of torque needed to rotate a rotor at a specific rate of rotation. In some embodiments, a halting command may be configured to stop a movement of a rotor during a flight of an aircraft.

Referring now to FIG. 1, an illustration of an exemplary embodiment of an aircraft 100 is shown. In some embodiments, aircraft 100 may include an electric aircraft. In some embodiments, aircraft 100 may include a vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, a number of aerodynamic forces may act upon the electric aircraft 100 during flight. Forces acting on an aircraft 100 during flight may include, without limitation, thrust, the forward force produced by the rotating element of the aircraft 100 and acts parallel to the longitudinal axis. Another force acting upon aircraft 100 may be, without limitation, drag, which may be defined as a rearward retarding force which is caused by disruption of airflow by any protruding surface of the aircraft 100 such as, without limitation, the wing, rotor, and fuselage. Drag may oppose thrust and acts rearward parallel to the relative wind. A further force acting upon aircraft 100 may include, without limitation, weight, which may include a combined load of the electric aircraft 100 itself, crew, baggage, and/or fuel. Weight may pull aircraft 100 downward due to the force of gravity. An additional force acting on aircraft 100 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, aircraft 100 are designed to be as lightweight as possible. Reducing the weight of the aircraft and designing to reduce the number of components is essential to optimize the weight. To save energy, it may be useful to reduce weight of components of an aircraft 100, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on aircraft 100 and/or propulsors.

Referring still to FIG. 1, aircraft 100 may include at least a vertical propulsor 104 and at least a forward propulsor 108. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 104 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 1, at least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, during flight, a number of forces may act upon the electric aircraft. Forces acting on an aircraft 100 during flight may include thrust, the forward force produced by the rotating element of the aircraft 100 and acts parallel to the longitudinal axis. Drag may be defined as a rearward retarding force which is caused by disruption of airflow by any protruding surface of the aircraft 100 such as, without limitation, the wing, rotor, and fuselage. Drag may oppose thrust and acts rearward parallel to the relative wind. Another force acting on aircraft 100 may include weight, which may include a combined load of the aircraft 100 itself, crew, baggage and fuel. Weight may pull aircraft 100 downward due to the force of gravity. An additional force acting on aircraft 100 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 2:
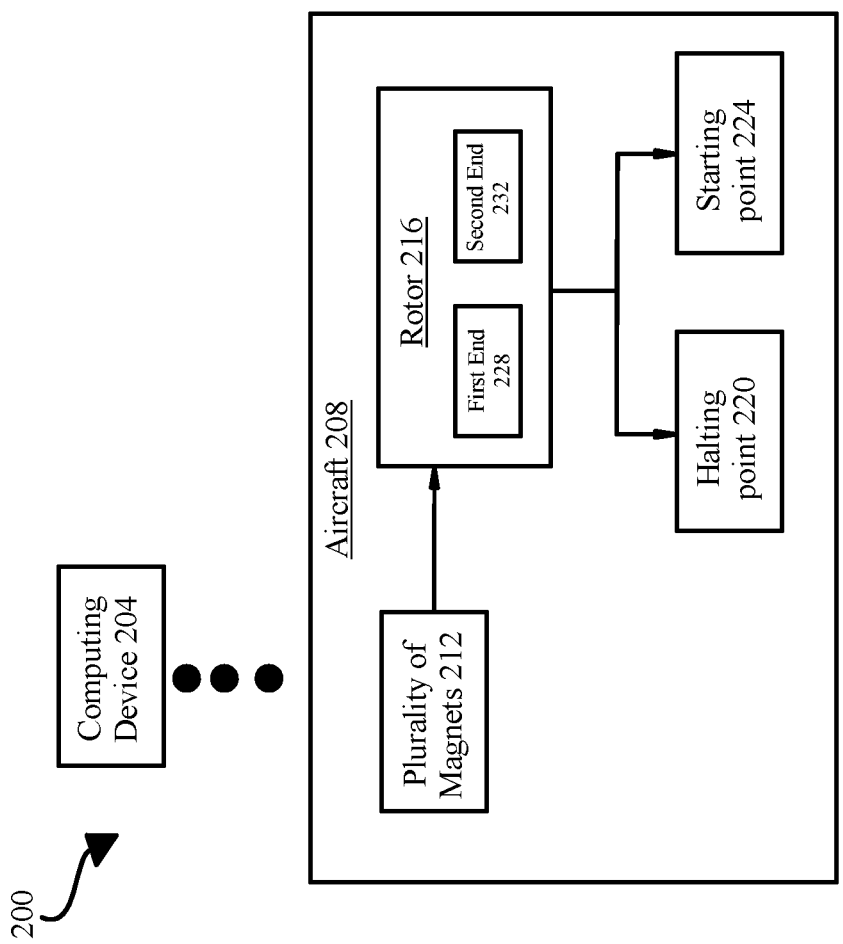
FIG. 2 is a block diagram of a system of rotor management.

Referring now to FIG. 2, an exemplary embodiment of a rotor management system 200 is illustrated. System 200 may include an aircraft 208. In some embodiments, aircraft 208 may be an eVTOL. In some embodiments, aircraft 208 may have one or more states of operation. Aircraft 208 may have a hover state. In a hover state, aircraft 208 may be moving through the air along a vertical path. In some embodiments, aircraft 208 may be in a hover state during liftoff operations. In another embodiment, aircraft 208 may be in a hover state in landing operations. In other embodiments, a hover state may be when aircraft 208 maintains an altitude when airborne. Aircraft 208 may use rotors 216 to achieve ascent and descent in a hover state. In some embodiments, aircraft 208 may have a fixed-wing flight state. Aircraft 208 may be in a fixed-wing flight state during forward, backward, and sideways propulsion. A fixed-wing flight state may include edgewise flight. In some embodiments, aircraft 208 may have a first set of rotors for a hover state. In other embodiments, aircraft 208 may have a second set of rotors for a fixed-wing flight state. In some embodiments, aircraft 208 may use the same set of propulsors for both hover state and fixed-wing flight states.

In some embodiments, and with continued reference to FIG. 2, system 200 may include a computing device 204. In some embodiments, computing device 204 may include a flight controller. In some embodiments, a flight controller may be as described below with reference to FIG. 4.

In some embodiments, computing device 204 may have a sensor. In some embodiments, computing device 204 may be configured to detect a plurality of flight operations of aircraft 208. In some embodiments, computing device 204 may detect a change of aircraft 208 during a transition of aircraft 208 between a fixed-wing flight state and a hover state. In some embodiments, system 200 may have at least a magnetic element 212.

With continued reference to FIG. 2, a at least a magnetic element 212 may be configured to operably move rotor 216. At least a magnetic element 212 may be coupled to rotor 216. In some embodiments, rotor 216 and movement thereof may be as described in U.S. patent application Ser. No. 16/938,952, filed Jul. 25, 2020, titled "INTEGRATED ELECTRIC PROPULSION ASSEMBLY", of which is incorporated by reference herein in its entirety. In some embodiments, at least a magnetic element 212 may include a plurality of components configured to apply a torque to rotor 216. In some embodiments, at least a magnetic element 212 may include an element that may generate a magnetic field. For example, at least a magnetic element 212 may include one or more magnets which may be assembled in rows along a structural casing component. Further, at least a magnetic element 212 may include one or more magnets having magnetic poles oriented in at least a first direction. One or more magnets may include at least a permanent magnet. Permanent magnets may be composed of, but are not limited to, ceramic, alnico, samarium cobalt, neodymium iron boron materials, any rare earth magnets, and the like. Further, one or more magnets may include an electromagnet. As used herein, an electromagnet is an electrical component that generates magnetic field via induction. An electromagnet may include a coil of electrically conducting material, through which an electric current flow to generate the magnetic field, also called a field coil of field winding. A coil may be wound around a magnetic core, which may include without limitation an iron core or other magnetic material. A core may include a plurality of steel rings insulated from one another and then laminated together. A plurality of steel rings may include slots in which the conducting wire will wrap around to form a coil. at least a magnetic element 212 may act to produce or generate a magnetic field to cause other magnetic elements to rotate, as described in further detail below. Rotor 216 may include a frame to house components including at least a magnetic element 212, as well as one or more other elements or components. In an embodiment, a magnetic field may be generated by at least a magnetic element 212 and may include a variable magnetic field. In embodiments, a variable magnetic field may be achieved by use of an inverter, a controller, or the like. In some embodiments, a at least a magnetic element 212 may include a plurality of inverters that may be configured to transform DC power to AC power. The AC power may be used to drive the rotor by adjusting the frequency and voltage supplied to the rotor. In some embodiments, a plurality of inverters may be configured to output between 100 and 300 kwh of electrical power to rotor 216. In some embodiments, a plurality of inverters may be configured to output 200 kwh of electrical power to rotor 216. An inverter may be entirely electronic or a combination of mechanical elements and electronic circuitry. An invertor may allow for variable speed and torque of rotor 216 based on the demands of the aircraft 208. In some embodiments, inverters of a plurality of inverters may include a plurality of wires. A plurality of wires may be wound around one or more stators of rotor 216. A plurality of wires may have multiple windings around one or more stators of rotor 216. In some embodiments, each winding of the plurality of wires may be connected to a different inverter. Computing device 204 may be configured to communicate data to and from the at least a magnetic element 212. In some embodiments, computing device 204 may communicate data to and from the at least a magnetic element 212 wirelessly. In other embodiments, computing device 204 may communicate data to and from at least a magnetic element 212 via a wired connection. In some embodiments, computing device 204 may be configured to send commands to at least a magnetic element 212. In some embodiments, computing device 204 may send a command to at least a magnetic element 212 to apply a torque to rotor 216. In some embodiments, at least a magnetic element 212 may be configured to apply between 10 and 30 newton meters of torque to rotor 216. In some embodiments, at least a magnetic element 212 may be configured to apply a torque of 22 newton meters to rotor 216.

In some embodiments, and with continued reference to FIG. 2, computing device 204 may send a command to at least a magnetic element 212 to apply a clockwise torque to rotor 216. In other embodiments, computing device 204 may send a command to at least a magnetic element 212 to apply a counter-clockwise torque to rotor 216. In some embodiments, computing device 204 may send a command to at least a magnetic element 212 to apply zero torque to rotor 216.

In some embodiments, and still referencing FIG. 2, rotor management system 200 may have a second set of magnetic elements. Computing device 204 may send a command to a second set of magnetic elements to keep rotor 216 in a stationary position. In some embodiments, computing device 204 may send commands to at least a magnetic element 212 to move rotor 216 within a tolerance range of parking. In some embodiments, a tolerance range may be +2 degrees. In other embodiments, a tolerance range may be −2 degrees. In yet other embodiments, a tolerance range may be between −10 degrees to +10 degrees. In other embodiments, a tolerance may be greater than or less than between −10 degrees to +10 degrees. In some embodiments, a tolerance range may be determined based on battery levels of aircraft 208. In other embodiments, a tolerance range may be determined based on heating caused by a parking and unparking of rotor 216. Computing device 204 may detect a transition of aircraft 208 between a hover state and a fixed-wing flight state. Computing device 204 may send a plurality of commands to at least a magnetic element 212. In some embodiments, computing device 204 may detect aircraft 208 in a hover state. Computing device 204 may send a command to at least a magnetic element 212 to position rotor 216 to aid aircraft 208 in a hover state. Computing device 204 may send a command to at least a first set of inverters 210 to allow free rotation of rotor 216. In a hover state, rotor 216 may generate lift to move aircraft 208 along a vertical path. Computing device 204 may detect aircraft 208 in a fixed-wing flight state. In some embodiments, in a fixed-wing flight state, a command to position rotor 216 to reduce air resistance of aircraft 208 may be sent to at least a magnetic element 212. Rotor 216 may be aligned along a longitudinal axis of aircraft 208. In other embodiments, computing device 204 may determine a minimal drag axis of electric aircraft 208. In some embodiments, the minimal drag axis may align with a distal end of a first end 228 of rotor 216 to a distal end of a second end 232 of rotor 216. In other embodiments, computing device 204 may determine a minimal drag axis based on surrounding airflow of aircraft 208. A drag minimization axis and determining thereof may be as described in U.S. patent application Ser. No. 17/362,454 filed Jun. 29, 2021, titled "METHOD OF PROPULSOR MANAGEMENT IN ELECTRIC AIRCRAFT", of which is incorporated herein by reference in its entirety. Computing device 204 may send a command to at least a magnetic element 212 to position rotor 216 to point towards a direction of surrounding airflow in order to reduce drag.

In some embodiments, and with continued reference to FIG. 2, rotor 216 may be configured to be in a halting point 220. A "halting point" as used in this disclosure is a physical position that a moving rotor is in when the moving rotor comes to a complete stop. Halting point 220 may include a position in which rotor 216 may be halted or otherwise slowed to a complete stop. In some embodiments, halting point 220 may include a point of minimum drag across rotor 216. Halting point 220 may be expressed in terms of a time, such as, but not limited to, a time at which to start applying a negative torque to rotor 216. In some embodiments, halting point 220 may be expressed in terms of an angle, such as, but not limited to, an angle in advance of a desired halted position at which to begin applying negative torque to rotor 216. In some embodiments, halting point 220 may be configured to include a position in which first end 228 of rotor 216 and second end 232 of rotor 216 may be aligned across a minimum drag axis. In some embodiments, first end 228 of rotor 216 may have a greater length than second end 232 of rotor 216. First end 228 and second end 232 of rotor 216 may be configured to include differing lengths that may reduce air drag in halting point 220 during a forward movement of aircraft 208, such as a transition from a hover state to a fixed-wing flight state.

Continuing to reference FIG. 2, in some embodiments system 200 may include a zero crossing indicator. In some embodiments, a zero crossing indicator can include a reflective patch. A zero crossing indicator may be placed beneath rotor 216. A zero crossing indicator may be configured to detect when rotor 216 is in halting point 220. A zero crossing indicator may be configured to detect a rotational angle of rotor 216. In some embodiments, a zero crossing indicator may be configured to detect a rotational speed of rotor 216. In some embodiments, a zero crossing indicator may be configured to detect a torque of rotor 216. Computing device 204 may be configured to communicate with a zero crossing indicator. Computing device 204 may be configured to send a command to at least a magnetic element 212 based on data received from a zero crossing indicator. A command sent to at least a magnetic element 212 may include a command to apply a torque to rotor 216. A feedback loop may be implemented where computing device 204 may continuously adjust how much torque is applied from at least a magnetic element 212 to rotor 216. At least a magnetic element 212 may be configured to adjust and/or control a movement of rotor 216.

Continuing to reference FIG. 2, system 200 may include a plurality of sensing devices, such as, but not limited to, accelerometers, gyroscopes, inertial measurement unit (IMU) and the like. In some embodiments, a plurality of sensing devices may be configured to be in communication with computing device 204. Computing device 204 may be able to measure an acceleration and/or angular rate of rotor 216 through a plurality of sensing devices. In some embodiments, rotor 216 may include a plurality of laser. Rotor 216 may include one or more lasers that may be configured to point downward towards aircraft 208 so as to trace a circle during a movement of rotor 216. In some embodiments, system 200 may include laser sensors that may be configured to detect a plurality of lasers emitting from rotor 216. In some embodiments, a rotational angle may be determined by the plurality of laser sensors.

In some embodiments, and continuing to refer to FIG. 2, computing device 204 may be configured to calculate a halting point 220. Computing device 204 may calculate halting point 220 while rotor 216 is in motion. Computing device 204 may calculate halting point 220 continuously and/or in real-time. Computing device 204 may detect a time or angle at which to begin halting rotor 216. Computing device 204 may be configured to look for a starting time and/or angle at which to begin halting rotor 216. In some embodiments, a specific time and/or angle may include a triggering point. At a triggering point, computing device 204 may be configured to begin a halting of rotor 216. Halting of rotor 216 may include computing device 204 sending a command to at least a magnetic element 212 to apply a torque to rotor 216. Computing device 204 may be configured to detect an unstable position of rotor 216 in halting point 220. In some embodiments, computing device 204 may start a position stability check of rotor 216 once rotor 216 has stopped and an angular speed of rotor 216 is zero. A stable position may include a position in which first end 228 of rotor 216 and second end 232 of rotor 216 are within a tilt angle. A tilt angle may include a range of acceptable angles in which first end 228 of rotor 216 and second end 232 of rotor 216 may be offset from a horizontal axis and/or level plane. If first end 228 and second end 232 of rotor 216 are not within an acceptable range of tilt angles, computing device 204 determines rotor 216 is in an unstable position. Computing device 204 may send a command to at least a magnetic element 212 to correct a position of rotor 216. In some embodiments, computing device 204 may perform a position stability check of rotor 216 while rotor 216 has not come to a complete stop. In some embodiments, computing device 204 may send a command to at least a magnetic element 212 to rotate rotor 216 in a positive direction until rotor 216 is in a stable position. In a non-limiting example, computing device 204 may detect rotor 216 may be in an unstable position while rotating in a forward direction and providing lift to aircraft 208. Rather than work against a positive inertia by applying a negative torque to rotor 216, computing device 204 may instead rotate rotor 216 another portion of a rotation in a forward direction until rotor 216 is in a stable position. In some embodiments, computing device 204 may send a command to at least a magnetic element 212 to apply a positive torque to rotor 216 until rotor 216 is in a stable position. In some embodiments, rotor 216 may rotate for a set period of time. In some embodiments, rotor 216 may rotate at a steady angular speed in order to level out a first end and a second end of rotor 216. In some embodiments, system 200 may include a plurality of halting points 220.

In some embodiments, and with continued reference to FIG. 2, system 200 may include a starting point 224. Starting point 224 may include a point in which rotor 216 resumes movement. In some embodiments, starting point 224 may include a point at which a halting of rotor 216 starts. In some embodiments, starting point 224 may be configured to prevent premature halting of rotor 216. Computing device 204 may search for starting point 224 which may include, but is not limited to, half a complete rotation, a third of a complete rotation, a fourth of a complete rotation, or any fraction of a complete rotation of rotor 216.

Figure 3:
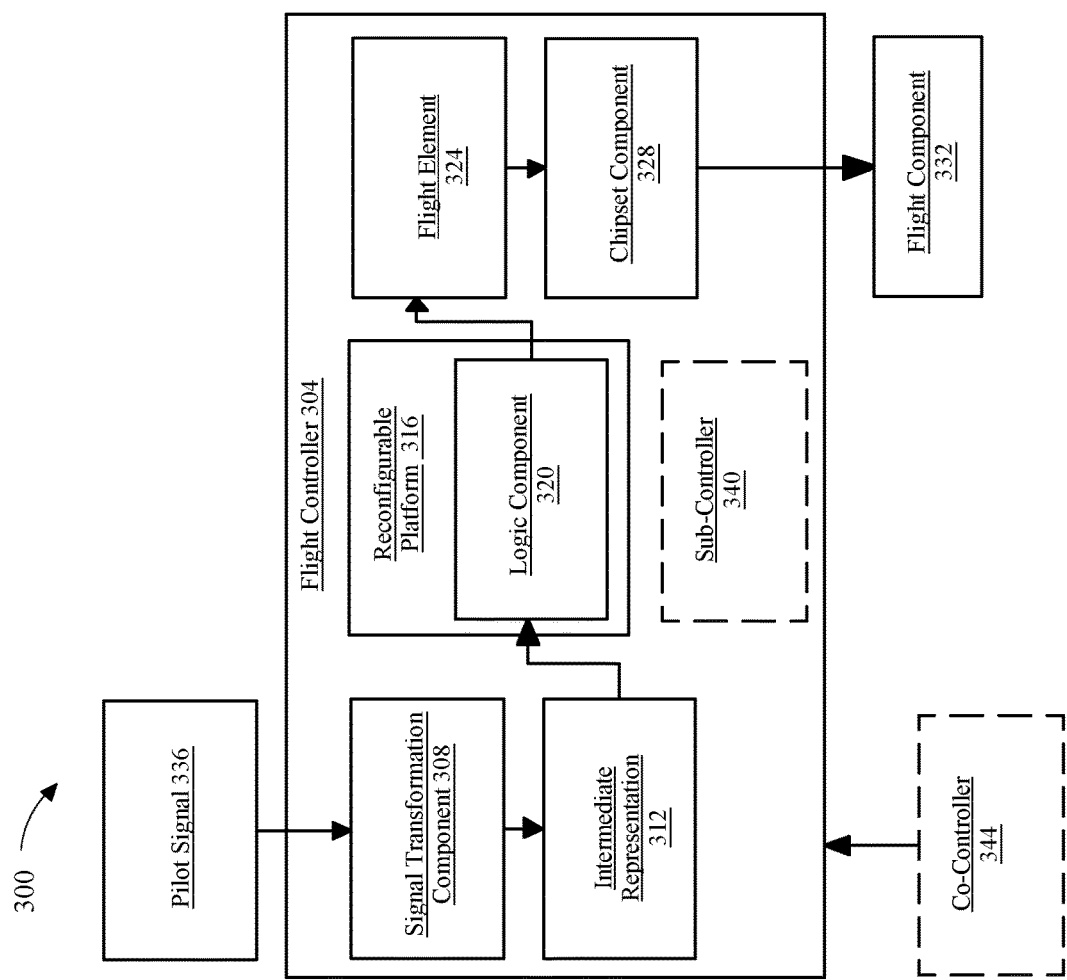
FIG. 3 is a block diagram of an exemplary embodiment of a flight controller system.

Now referring to FIG. 3, an exemplary embodiment 300 of a flight controller 304 is illustrated. Flight controller 304 may include a computing device 204 as described in FIG. 2. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal.

In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

Still referring to FIG. 3, in an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
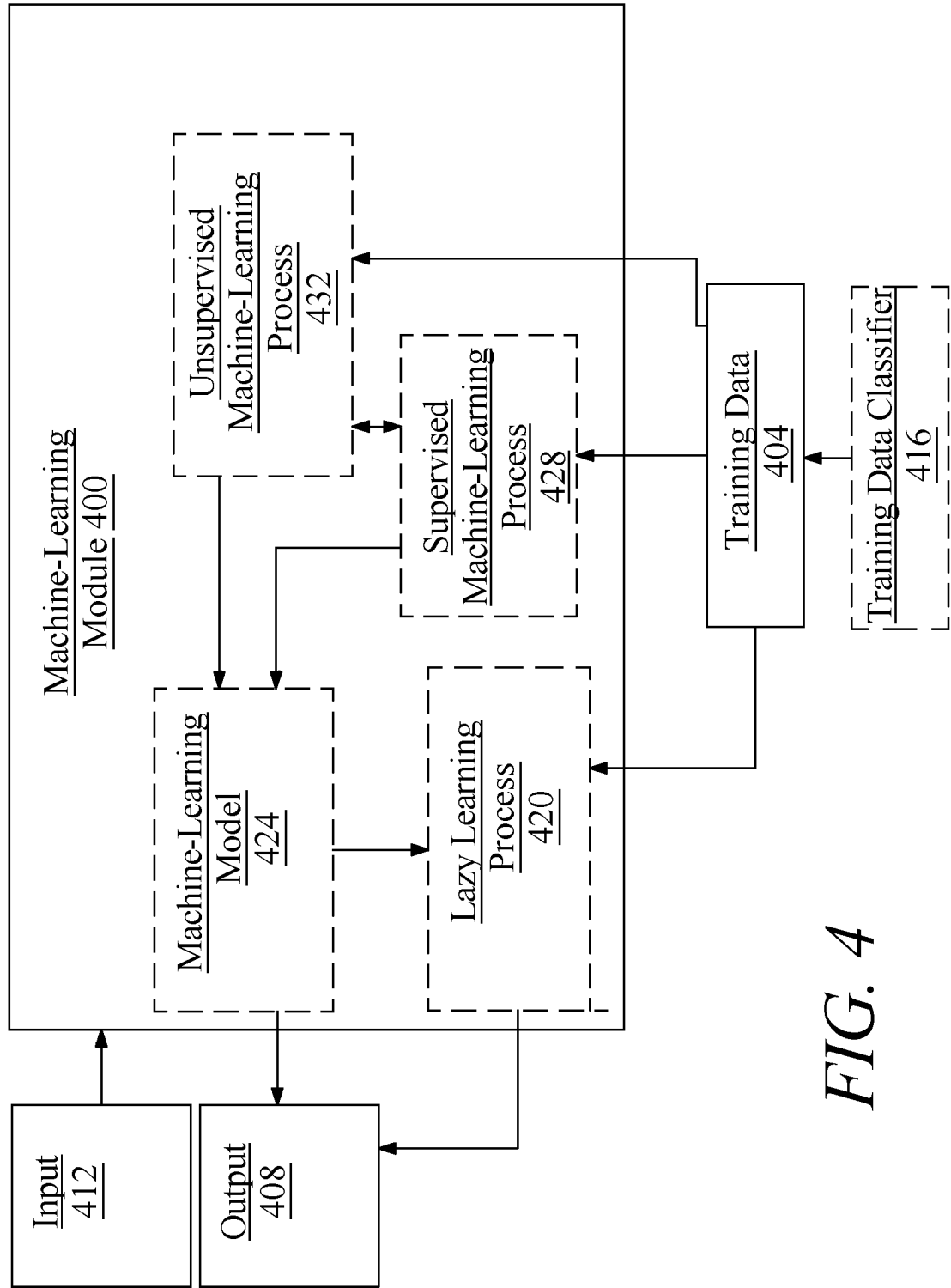
FIG. 4 is a block diagram of an exemplary embodiment of a computing system.

Referring now to FIG. 4, an exemplary embodiment of a machine-learning module 400 that may perform one or more machine-learning processes as described in this disclosure is illustrated. Machine-learning module 400 may be implemented in the determination of the flight states of the electric aircraft. Machine-learning module 400 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
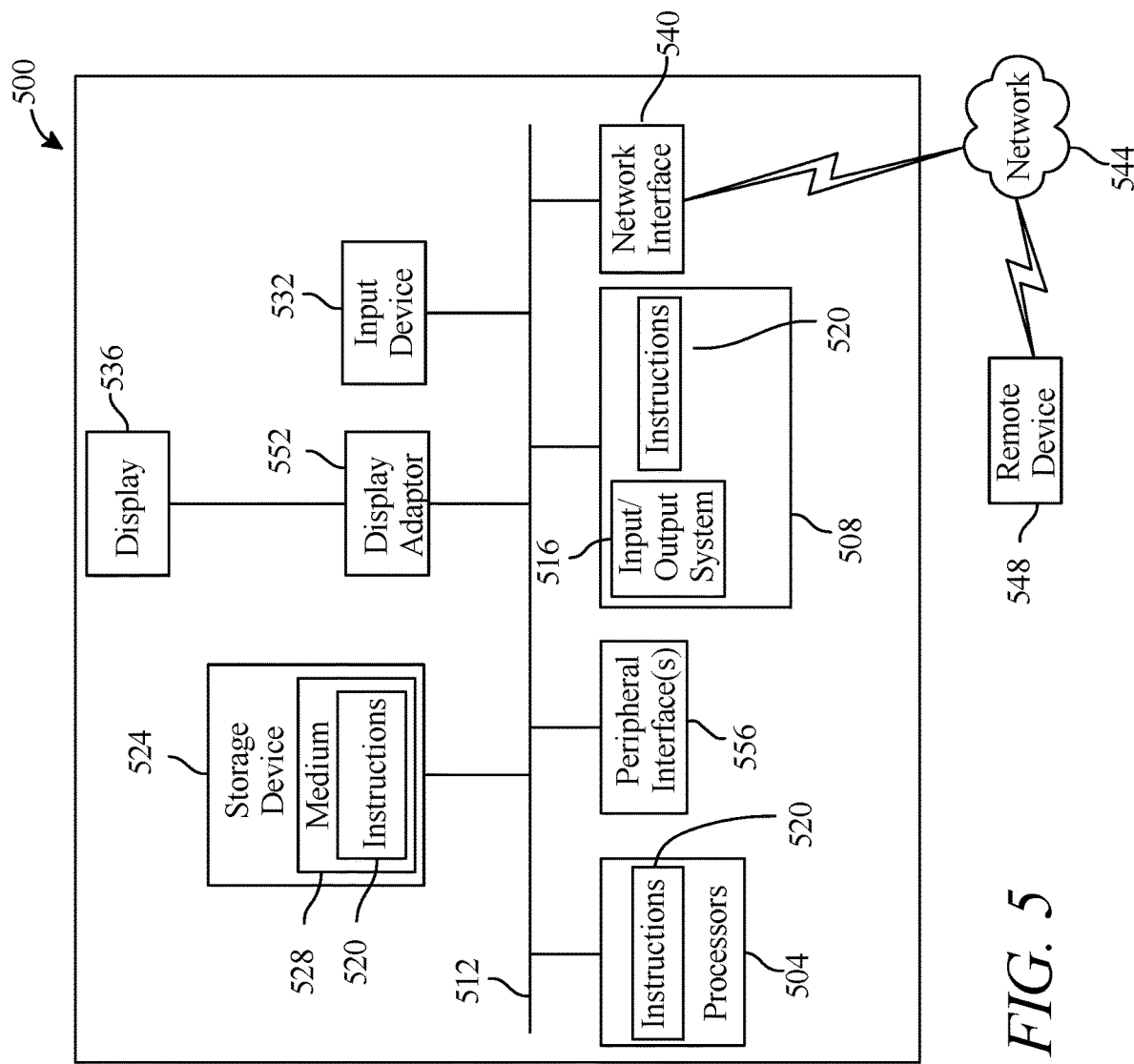
FIG. 5 is an exemplary embodiment of a machine learning system.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

Now referring to FIG. 6, a method 600 for rotor management of an aircraft is presented. At step 605, a drag minimization axis of a rotor is determined. A drag minimization axis may include an axis across a rotor in which air drag may be minimized. In a non-limiting example, a drag minimization axis may include a horizontal axis across a rotor that may allow a reduction of air resistance across the rotor. In some embodiments, a drag minimization axis may include a vertical axis across a rotor. In some embodiments, a drag minimization axis may include an offset angle from an otherwise horizontal and/or vertical axis. In some embodiments, a plurality of sensor may be used to determine a drag minimization axis of a rotor. In some embodiments, a rotor may include a vertical/and or horizontal rotor. A rotor may be connected to a vehicle. In some embodiments, a vehicle may include an aircraft. In some embodiments, a vehicle may include an electric aircraft, such as an eVTOL. A drag minimization axis may be determined through a feedback loop of a plurality of sensors and a computing device. A drag minimization axis may continuously be updated, such as in real-time.

Still referring to FIG. 6, at step 610, a halting point of the rotor is determined. A halting point may include a point in which a rotor may stop all motion. In some embodiments, a halting point may include a drag minimization axis. In some embodiments, a halting point may include a stable position. A stable position may include a position in which a first end and second end of a rotor are within an acceptable tilt angle range. In some embodiments, a halting point may include a specific time period of a rotation of a rotor. In other embodiments, a halting point may include a specific rotational angle of a rotor.

Still referring to FIG. 6, at step 615, a halting command is sent to at least a magnetic element to stop a movement of the rotor. At least a magnetic element may be configured to apply a torque to a rotor. In some embodiments, at least a magnetic element may be configured to apply a positive and/or negative torque to a rotor. In some embodiments, at least a magnetic element may be configured to apply a torque to a rotor until the rotor is in a halting point. In some embodiments, at least a magnetic element may be configured to apply a net zero torque on a rotor. In some embodiments, at least a magnetic element may continually adjust a torque applied to a rotor based on feedback from a plurality of sensors of the rotor. In some embodiments, once a rotor is in a halting point, a computing device may determine if the rotor is in a stable position. In some embodiments, if it is determined that a rotor is not in a stable position, a command may be sent to at least a magnetic element to adjust the rotor until it is in a stable position.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system comprising:
  a computing device, wherein the computing device is configured to:
    determine a drag minimization axis of a rotor connected to an aircraft, the rotor having a first end and a second end, using a machine learning module in communication with a flight controller, wherein the rotor is configured to rotate about an axis, wherein determining the drag minimization axis further comprises determining the drag minimization axis of the rotor based on surrounding airflow of the aircraft during flight;
    determine a halting point of the rotor using a machine learning model generated by the machine learning module, wherein the halting point includes the drag minimization axis of the rotor and the machine learning model comprises a trained machine learning model trained by a first training data set; and
    send a halting command to at least a magnetic element to halt the rotor, wherein the halting command is configured to stop a movement of the rotor and position the rotor at the halting point, and the at least a magnetic element is configured to apply a positive torque to the rotor to operably move the rotor to a stable position for operation of the aircraft, and the at least magnetic element comprises at least an inverter configured to adjust a speed and torque of the rotor, wherein the at least magnetic element comprises a tolerance range of parking between negative two degrees and two degrees with respect to the stable position, and wherein the halting command is further configured to position the rotor to point towards a direction of the surrounding airflow in order to reduce drag;
    wherein the position of the rotor in the halting point includes the first end pointing in one direction of the drag minimization axis and the second end pointing in an opposite direction of the first end.

2. The system of claim 1, wherein determining a halting point of the rotor includes determining if the rotor is in a stable position once the rotor has halted.

3. The system of claim 2, wherein if the rotor is determined to not be in a stable position, the computing device is configured to send a command to the at least a magnetic element to rotate the rotor in a direction of rotation until the rotor is in a stable position.

4. The system of claim 1, wherein the computing device is further configured to:
detect a torque of the rotor; and
send a command to the at least a magnetic element to apply a net zero torque to the rotor.

5. The system of claim 1, wherein the computing device is further configured to:
determine a starting point of the rotor;
determine a rotational angle of the rotor; and
send a command to the at least a magnetic element to rotate the rotor to the starting point based on the rotational angle of the rotor.

6. The system of claim 5, wherein the starting point of the rotor includes a point of the rotor to resume rotating after previously being halted.

7. The system of claim 1, wherein the computing device is further configured to continuously update the halting point of the rotor based on a feedback of a sensor of the rotor.

8. The system of claim 1, wherein the computing device is configured to utilize the machine learning model to determine an optimal halting point.

9. The system of claim 1, wherein the computing device is configured to determine a starting point of the rotor while the rotor is in the halted position.

10. The system of claim 1, wherein the computing device is configured to determine a torque threshold, wherein the torque threshold is a torque amount needed to rotate the rotor in a specific rate of rotation.

11. The system of claim 1, wherein the halting command is further configured to stop a movement of the rotor during a flight of the aircraft.

12. A method comprising:
determining, a drag minimization axis of a rotor connected to an aircraft using a machine learning module in communication with a flight controller, the rotor having a first end and a second end, wherein the rotor is configured to rotate about an axis, wherein determining the drag minimization axis further comprises determining the drag minimization axis of the rotor based on surrounding airflow of the aircraft during flight;
determining, using a machine learning model generated by the machine learning module, a halting point of the rotor, wherein the halting point includes the drag minimization axis of the rotor and the first machine learning model comprises a trained first machine learning model trained by a first training data set; and
sending, a halting command to at least a magnetic element to halt the rotor, wherein the halting command is configured to stop a movement of the rotor and position the rotor in the halting point, wherein the at least a magnetic element is configured to apply a positive torque to the rotor to operably move the rotor to a stable position for operation of the aircraft and the at least magnetic element comprises at least an inverter configured to adjust a speed and torque of the rotor, wherein the at least magnetic element comprises a tolerance range of parking between negative two degrees and two degrees with respect to the stable position, and wherein the halting command is further configured to position the rotor to point towards a direction of the surrounding airflow in order to reduce drag;
wherein the position of the rotor in the halting point includes the first end pointing in one direction of the drag minimization axis and the second end pointing in an opposite direction of the first end.

13. The method of claim 12, wherein determining a halting point of the rotor includes determining if the rotor is in a stable position once the rotor has halted.

14. The method of claim 12, wherein if the rotor is determined to not be in a stable position, the computing device is configured to send a command to the at least a magnetic element to rotate the rotor in a direction of rotation until the rotor is in a stable position.

15. The method of claim 12, wherein the computing device is further configured to:
detect a torque of the rotor; and
send a command to the at least a magnetic element to apply a net zero torque to the rotor.

16. The method of claim 12, wherein the computing device is further configured to:
determine a starting point of the rotor;
determine a rotational angle of the rotor; and
send a command to the at least a magnetic element to rotate the rotor to the starting point based on the rotational angle of the rotor.

17. The method of claim 16, wherein the starting point of the rotor includes a point of the rotor to resume rotating after previously being halted.

18. The method of claim 12, wherein the computing device is further configured to continuously update the halting point of the rotor based on a feedback of a sensor of the rotor.

19. The method of claim 12, wherein the computing device is configured to determine a torque threshold, wherein the torque threshold is a torque amount needed to rotate the rotor in a specific rate of rotation.

20. The method of claim 12, wherein the halting command is further configured to stop a movement of the rotor during a flight of the aircraft.

* * * * *